Patented July 20, 1943

2,324,968

UNITED STATES PATENT OFFICE 2,324,968

REMOVAL OF BARK FROM TREES

Alexander Robert White, Port Arthur, Ontario, Canada

No Drawing. Application December 6, 1941, Serial No. 421,964

5 Claims. (Cl. 47—57.5)

The invention relates to improvements in the removal of bark from trees and the objects of the invention are to revolutionize the method of removing the bark from trees and avoid the necessity of the use of expensive equipments that are at present employed for mechanically accomplishing that purpose; to speed up production through alleviating the tasks of the workmen, decreasing unnecessary time lost by employing ordinary methods, and increasing the efficiency in the handling of the timber and thereby benefiting the lumbermen, workmen and the consumers; to enable the workmen to carry on their duties beyond the usual seasonal periods and, consequently, materially increasing the supply of timber for the market and at a saving to the lumbermen and others; to treat the living trees so that, when the proper period of time arrives for cutting down the trees, the bark on the trees will be in a condition to be easily removed therefrom; and, generally, to provide a method for the treatment of living trees for the removal of bark therefrom that will be easily applied, efficient for its purpose, and inexpensive in its operation.

It is deemed unnecessary to discuss the present method and mechanical contrivances that are commercially employed at present for the removing of bark from trees, except that considerable time is lost in such operation and expensive machinery used and very often the result being unsatisfactory, and it is the purpose of this invention to obviate all these drawbacks in the lumber industry by preparing a solution either in a dry or wet state which may be applied internally or externally to a living tree, and allowed to remain during a specified period of time and which will cause a chemical reaction to set into the living tree and have the effect of segregating the life contents of the tree proper from the bark, thereby advancing the "dead" stage of the bark to a considerable degree while the tree is yet in its actual living state. The living tree thus treated will gradually die, the period of time for accomplishing this purpose depending on the type of tree and the quality and/or quantity of the ingredients used in the treatment of the tree.

The chemicals that are used for this purpose may vary in accordance with the class of trees such as the conifers and dicotyledons and their sub-classes pines, spruces and other soft woods, and oak, ash, beech and teak and other hard wood, as well as the time period desired to accomplish its purpose.

Such following chemicals may be used, calcium chloride, sodium chlorate, formaldehyde, ammonium bifluoride, copper sulphate, or nitrate, zinc chloride, sodium arsenite and other chemical compounds of a similar nature.

In order to fully appreciate the magnitude of this invention, it is necessary to understand the make-up of exogenous plants in which the growth of the stem is in successive concentric layers and formed of a central portion called the medulla or pith surrounded by a medullary sheath and medullary rays and the usual circles of annular growth and the bark.

The cortex, which is the bark, is separated from the wood by a microscopically thin sheet called the cambium, the combium being the means for producing new wood and which generally occurs during spring and part of the summer, and being generally inactive during the autumn and winter seasons.

These concentric layers consist of narrow spindle shape fibres and generally called tracheids and run parallel to the long axis of the trunk or branch, and on at least two of its sides provided with a series of thin round patches called the pits through which water or sap can pass from fibre to fibre, although certain trees, in addition to the fibres, have resin containing tubes and which run parallel with the fibres.

It will therefore be understood from the above that the vascular system of the tree together with the cambium and the gaseous interchange of oxygen and carbon dioxide involved in respiration and other vital functions as assimilation and transpiration occurring through the epidermis and generally through the living parenchyma which is the cortex, form the means for feeding and keeping the tree alive and growing.

It is, therefore, the purpose of interfering with this system of feeding and circulation in the tree that will cause it to die and at the same time release the bark from its vital contact with the rest of the wood, and enable its quick removal by the workman.

An acceptable method of injecting the chemical substances into the living tree, which is preferably accomplished during the months of May, June, July and August—known as the growing season, is by girdling the tree and removing an approximate two inch section of bark so as to expose the cambium layer and the sap wood. A saw cut is made preferably at the bottom of the girdle, cutting into at least three annular rings or layers of wood, and it is, of course, understood that this saw cut is made completely around the tree and all sawdust from this operation carefully removed.

A suitable aqueous solution or a dry salt is then introduced into a cheese cloth bandage and tied around the tree at the point where the bark has been removed and the operation has now been completed.

As the tree absorbs the moisture from the air it will also absorb the chemical substance located in the cheesecloth and this substance, with the moisture from the air, is carried up the sapwood into the sap stream, ascending the stem of the tree to its crown and returning by general seepage either down the immature cambium layer or directly down the cortex layer, which is the inner bark, and this will have the effect of destroying both of these layers and causing them to shrink, so that the bark can be easily removed at any season of the year or, should this method not be desired, the tree after it has been cut, and what may be called the timber, may be placed in water for the period of a week and the entire bark structure will soften and fall off and, thereby, providing a method of bark removal particularly in pulpwood logging that will be much less expensive than anything at present known.

A suitable substance for accomplishing this purpose is the combining of a predetermined quantity of calcium chloride and a predetermined quantity of sodium chlorate in a proportion of approximately three parts of calcium chloride to one of sodium chlorate.

The application of the chemical substance has been hereinbefore described as being absorbed by the tree but it will, of course, be understood that the chemical substance may be directly injected into the tree and accomplish approximately the same purpose.

The length of time before the actual effect takes place in a tree after the operation will alter in accordance with the class of tree, size and structure, and the chemical substance or substances that are used, such as the type, strength and quantity, but, generally speaking, it will take approximately four days for the chemical substance or substances to take effect after an operation of this kind, by which time the tree will begin to die and, at the end of approximately a week or so, the tree is completely dead and ready to be cut down at the convenience of the workman.

What I claim is:

1. The removal of bark from trees, consisting in girdling the tree and removing a predetermined section of bark therefrom and exposing the cambium layer and the sapwood, the formation of a cut around the tree and at the bottom of the girdle for a depth of approximately three annual rings of wood, the preparation of a toxicant consisting of calcium chloride and sodium chlorate in a proportion of approximately three parts of calcium chloride to one of sodium chlorate, and introducing the solution into a fabric container and applying the container to the cut portion of the tree and therearound, and allowing the absorption of the solution, with the moisture from the air, by the tree for its carriage up the sapwood and into the sap stream, ascending the stem of the tree to its crown and returning by general seepage either down the cambium layer or down the cortex layer, and destroying these layers and causing a shrinkage and thereby allowing the easy removal of the bark.

2. In the treatment of living trees for the removal of their bark, consisting in the introduction of a chemical compound to the crude sap stream of the selected tree at a convenient cutting height by girdling, and the formation of a cut around the tree at the girdled portion and adapted to cause a gradual decline and subsequent death of the tree and dislodging the close affinity of the bark to the cortex and the cambium of the tree and thereby allowing the easy removal of the bark.

3. In the treatment of living trees for the removal of their bark, consisting in the introduction of a toxicant to the crude sap stream of the selected tree at a convenient cutting height, by girdling and the formation of a cut at a predetermined depth around the tree at the girdled portion, and the application of a laminated paper bandage to which is added the toxicant in paste form to the girdled portion of the tree and the absorption of the toxicant by osmosis and cutting transpiration and respiration of the tree and consequently effecting the decline and subsequent death of the tree, and dislodging the close affinity of the bark to the cortex and the cambium of the tree and thereby allowing the easy removal of the bark.

4. In the treatment of living trees for the removal of their bark consisting in the introduction of an alkali in the form of a toxicant to the sap stream of the selected tree at a predetermined cutting height by girdling and the formation of a cut at a predetermined depth around the tree and at the girdled portion, and the application of a bandage formed of fabric of an open texture to which is added the toxicant to the girdled portion of the tree, the toxicant adapted to be absorbed with the oxygen and carbon dioxide through the cut in the tree and flow into the sap stream thereof and thereby causing the disruption of the cellular system and the subsequent death of the tree and separating the homogeneity between the bark and the wood for the easy removal of the bark therefrom.

5. In the treatment of living trees for the removal of their bark, consisting in the introduction of a toxicant formed of calcium chloride and sodium chlorate to the sap stream of the selected tree at a convenient cutting height by girdling, and the formation of a cut around the tree at the girdled portion and adapted to cause a gradual decline and subsequent death of the tree and dislodging the close affinity of the bark to the cortex and the cambium of the tree and thereby allowing the easy removal of the bark.

ALEXANDER ROBERT WHITE.